United States Patent

Shirley et al.

[15] 3,678,706
[45] July 25, 1972

[54] UNIVERSAL JOINTS

[72] Inventors: Brian William Shirley; Philip Hutchinson, both of Birmingham, England

[73] Assignee: G.K.N. Birfield Transmissions Limited, Birmingham, England

[22] Filed: Nov. 20, 1970

[21] Appl. No.: 91,561

[30] Foreign Application Priority Data

Nov. 20, 1969 Great Britain ...................... 56,739/69

[52] U.S. Cl. .................................................. 64/7, 64/21
[51] Int. Cl. .................................................... F16d 3/20
[58] Field of Search .................................... 64/7, 9, 9 A, 21

[56] References Cited

UNITED STATES PATENTS

| 2,617,279 | 11/1952 | Miller, Jr. | 64/9 X |
| 3,540,232 | 11/1970 | Breuer | 64/21 X |
| 2,968,936 | 1/1961 | Croset | 64/21 |
| 3,162,024 | 12/1964 | Breuer et al. | 64/21 X |
| 3,310,961 | 3/1967 | Ristau | 64/21 |

Primary Examiner—Kenneth W. Sprague
Attorney—Spencer & Kaye

[57] ABSTRACT

In a plunging constant velocity universal joint the inner member is formed with a bore containing bearing means having bearing surfaces centered on the joint center, a location member is contained in the bore and has a part-spherical outer surface engaging the bearing means. Resilient means or travel limiting means act between the location member and the outer member of the joint.

8 Claims, 5 Drawing Figures

UNIVERSAL JOINTS

BACKGROUND OF THE INVENTION

1. Field of the Invention

This invention relates to universal joints of the constant velocity type which are capable of accommodating relative axial movement between the driving and driven members of the joint. Such joints are hereinafter referred to as plunging C.V. joints.

In a transmission assembly which includes a plunging C.V. joint at each end of a shaft, it may be necessary to damp or to limit axial movements of the shaft, particularly when the shaft and joints are of large dimensions as would be used in, for example, transmissions for locomotives and heavy engineering applications.

2. Description of the Prior Art

Previous proposals to achieve damping of the axial movements of the shaft have included blocks of elastomeric material acting on the ends of the shaft or have included a spring acting between the driving and driven members of each joint.

The blocks of elastomeric material which have been used have not been capable of progressive damping over the whole range of relative axial movements and the springs have been positioned such that, on articulation of the joints, the springs have been subject to frequent distortion and buckling thus reducing their fatigue life.

It is accordingly an object of the invention to provide an improved plunging C.V. joint which includes damping spring means acting along the joint axis irrespective of joint angulation thereby avoiding the possibility of spring failure due to continual distortion or buckling in operation.

A number of proposals have been made for limiting axial movements of a plunging C.V. joint but it is a further object of the invention to provide a limited travel plunging C.V. joint formed from components used to produce a damped plunging C.V. joint.

SUMMARY OF THE INVENTION

The inner member of a plunging C.V. joint is formed with a bore containing bearing means having internal part-spherical surface means the center of curvature of which coincides with the joint center. A location member is contained in said bore and has a part-spherical outer surface complementary to that of the internal surface means of said bearing means. Resilient means or travel limiting means act between the location member and the outer member of the joint.

DESCRIPTION OF THE PREFERRED EMBODIMENTS

Figure 1:
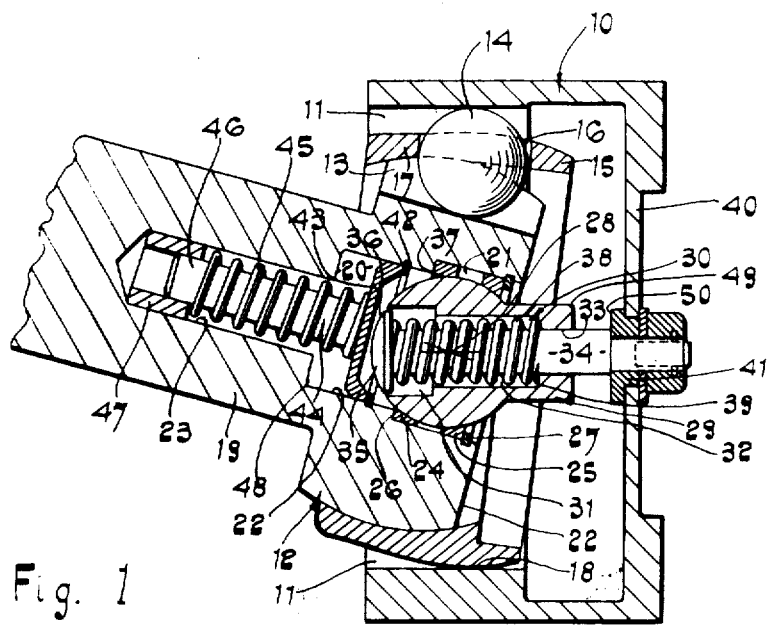
FIG. 1 is a sectional view of a plunging C.V. joint which includes damping means operative during relative axial movements between the inner and outer joint members.

The joint shown in FIG. 1 includes a hollow outer member 10 which has a cylindrical bore formed with a series of angularly spaced longitudinally extending grooves 11. An inner member 12 is provided within the outer member 10 and the inner member 12 has a part-spherical outer surface which is formed with a corresponding number of straight grooves 13 which co-operate with the grooves 11 to provide ball tracks along which balls 14 move during both joint articulation and plunge. A ball cage 15 with apertures 16 in which the balls 14 are closely received is positioned between the inner member 12 and the outer member 10. The cage has an inner part-spherical surface 17 and an outer part-spherical surface portion 18, the surface 17 mating with the complementary outer surface of the inner member 12 and the surface portion 18 engaging the cylindrical bore of the outer member 10.

The construction of the grooves 11 and 13 and the construction of the cage 15 is as fully described in U.S. Pat. specification No. 3,464,232.

The inner member 12 is formed integrally with a shaft 19 which extends between the joint shown in FIG. 1 and an identical joint provided at the other end of the shaft.

The inner member 12 is formed with a bore 20 which includes a first portion 21 which opens onto an end face 22 of the inner member 12 and an inner portion 22 which is of reduced cross-section compared with portion 21 and portion 22 is followed by a further portion 23 which is of reduced cross-section compared with portion 22.

A pair of bearing elements 24 and 25 are located within the first bore portion 21, bearing element 24 being located in engagement with a shoulder 26 provided by the junction between the first and second bore portions 21 and 22 and the bearing element 25 is located by engagement with a clip 27 received in an annular groove in the wall of bore portion 21.

The two bearing elements 24 and 25 have part-spherical bearing surfaces which are of the same radius of curvature and have the same center of curvature 28. The two bearing elements 24 and 25 engage the outer part-spherical surface of a location member 29, the center of curvature of the part-spherical surface of said location member 29 being constituted by the point 28.

The location member 29 is formed with a throughbore 30 which includes a mouth portion 31 followed by an intermediate portion 32 which is of reduced cross-section compared with the mouth portion 31 and a terminal portion 33 which is of reduced cross-section compared with the intermediate portion 32. The location member 29 is mounted on a fixed guide element 34 which is of cylindrical cross-section and is a close sliding fit in the terminal portion 33 of the bore 30. The fixed guide element 34 is provided with a head portion 35 which has a part-spherical presented surface 36, the head portion 35 being arranged for movement within the mouth portion 31 of the bore 30 and the extent of movement of the location member 29 relative to the fixed guide element 34 is limited by engagement of the head portion 35 with shoulder 37 provided at the junction between the mouth portion 31 and the intermediate portion 32 of the bore 30.

A helical compression spring 38 surrounds the fixed guide element 34 and is arranged to act between the head portion of the gude element 34 and a shoulder 39 provided at the junction between the intermediate portion 32 and the terminal portion 33 of the bore 30.

The guide element 34 is fixed to an end wall 40 of the outer member 10 by a fastener arrangement 41 so that the fixed guide element 34 is co-axial with the cylindrical bore of the outer member 10 and the spring 38 acting between the location member 29 and the fixed guide element 34 serves to damp relative axial movements between the outer member 10 and the inner member 12, the location member 29 being fixed against axial movements relative to the inner member 12 by virtue of its engagement with the part-spherical surfaces of the bearing elements 24 and 25.

A clip 42 is positioned in an annular groove in the second bore portion 22 of the bore 20 in the inner member 12 and the clip 42 acts as a stop for the head portion 43 of a spring-loaded element 44 which is positioned in the bore portions 22 and 23 of the bore 20 in the inner member 12 and which is urged by a helical spring 45 towards the stop afforded by the clip 42 for engagement with the head portion 35. of the fixed guide element 34. Member 44 includes a shaft 46 which, at its end remote from the head portion 43, fits within the bore of a bush located within the portion 23 of the bore 20 in the inner member 12. The shaft 46 has its longitudinal axis coincident with the central axis of the inner member 12, said central axis being arranged to pass through the center of curvature 28 of the location member 29 and the part-spherical bearing surfaces of the bearing elements 24 and 25.

In use, when relative axial movement takes place between the outer member 10 and the inner member 12 such that, as viewed in FIG. 1, the outer member 10 effectively moves to the left of said figure, the head portion 35 of the fixed guide element 34 will engage the head portion 43 of the spring-loaded element 44 to move element 44 inwardly of the bore portion 22 against the action of the spring 45, the range of such spring-loaded movement being limited by engagement of the head portion 43 with a shoulder 48 provided at the junction between the bore portions 22 and 23 of the bore 20. The range of movement of the location member 29 relative to the fixed guide element 34 is limited by engagement between the end face 49 of the location member 29 with an end face 50 of one of the fasteners of the fastener assembly 41.

When the relative axial movement which takes place is such that the outer member 10 effectively moves to the right as viewed in FIG. 1, the head portion 35 of the fixed guide element 34 will move inwardly of the mouth portion 31 of the bore 30, the extent of relative movement of the head portion 35 inwardly of the mouth portion 31 being limited by engagement of the head portion with the shoulder 37.

It is to be understood that, when relative axial movement takes place between the inner and outer members of the joint shown in FIG. 1, relative axial movement in the opposite direction will be taking place between the inner and outer members at the other end of the shaft 19, i.e. if the direction of relative movement is such that the inner member 12 of the joint shown in FIG. 1 moves towards the end wall 40 of the outer member 10, the inner member 12 of the joint at the other end of the shaft 19 will move away from the end wall of its associated outer member.

The springs 38 and 45 provide biassing means serving not only to bias the shaft 19 into a position in which it is central relative to the outer members 10 of the two joints but also providing damping means restraining the shaft 19 against axial movements.

The joint shown in FIG. 1 which includes a pair of springs is intended to be used when large amounts of plunge are likely to be encountered, e.g. where one spring would not have the capacity to control over such a large plunge. The joint is urged by the springs to its mid-plunge position.

Figure 2:
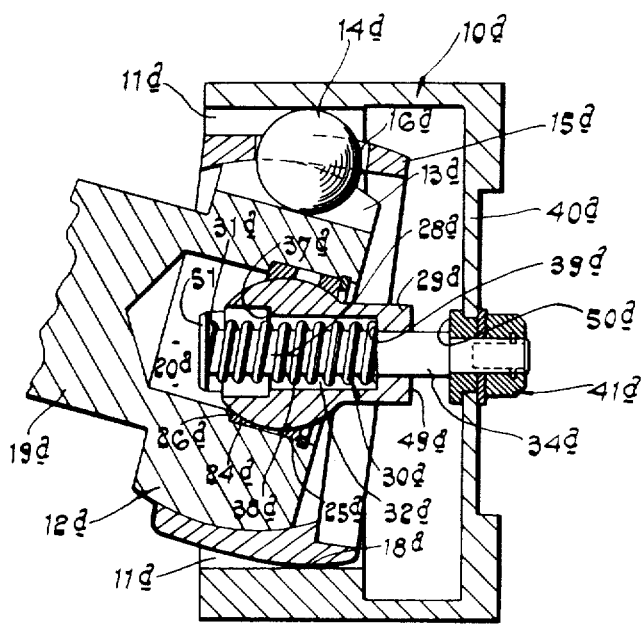
FIG. 2 is a sectional view of part of a plunging C.V. joint showing a modified form of damping means.

The joint arrangement shown in FIG. 2 is similar to that that is shown in FIG. 1, differing therefrom by the omission of the spring 45 acting on the element 44 of the joint of FIG. 1. The head 51 of the joint shown in FIG. 2 is of plate-like form as compared with the part-spherical form of the head portion 35 of the fixed guide element of FIG. 1. Otherwise the parts of the joint of FIG. 2 are the same as those of the joint shown in FIG. 1 and are indicated with corresponding reference numerals with the addition of the suffix a.

Figure 3:
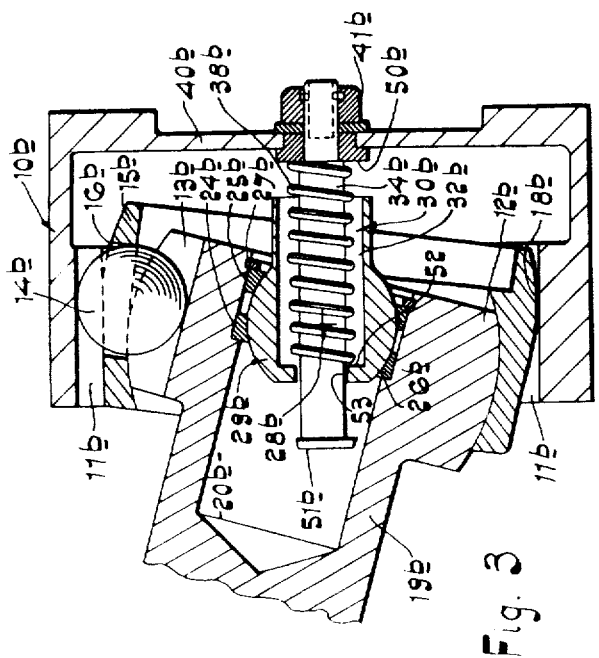
FIG. 3 is a further sectional view of part of a plunging C.V. joint showing a further modified form of damping means.

The joint arrangement shown in FIG. 3 is similar to that shown in FIG. 2 but differs therefrom as to the part between which the spring surrounding the fixed guide element acts. Those parts of the joint shown in FIG. 3 which are identical to the parts shown in FIG. 2 are indicated by like reference numerals with the addition of the suffix b. The joint shown in FIG. 3 has the spring 38b thereof acting between the end face 50b of the fastener arrangement 41b and between an abutment 52 constituted by a shoulder at the junction between the main portion 32b of the bore 30b and a reduced cross-section portion 53 of said bore.

The modes of operation of the joints shown in FIGS. 2 and 3 are basically as per that described above in relation to FIG. 1. The inner member of the joint of FIG. 2 is urged to one end of its travel whereas the inner member of the joint of FIG. 3 is urged to the other end of its travel.

Figure 4:
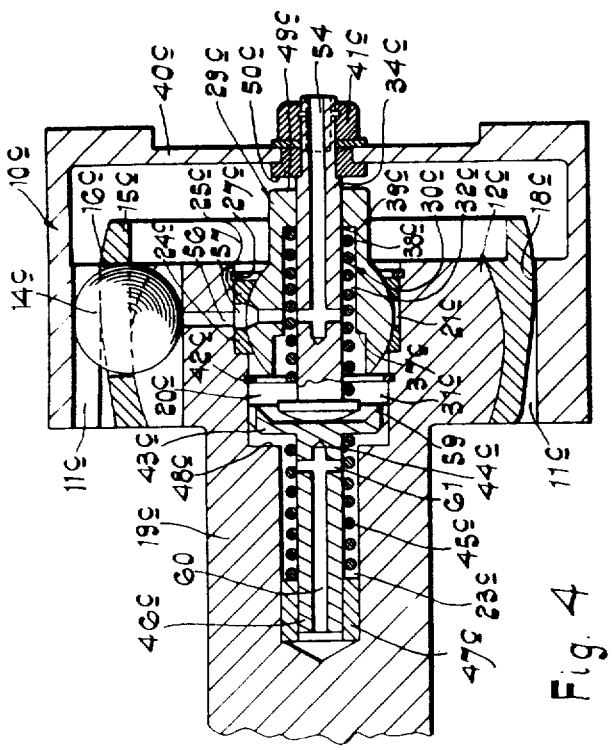
FIG. 4 is a sectional view of part of a plunging C.V. joint which includes damping means as shown in FIG. 1 and, in addition, is provided with a forced lubrication system and, FIG. 5 is a somewhat diagrammatic representation of a pair of plunging C.V. joints provided one at either end of a torque-transmitting shaft.

The joint shown in FIG. 4 is basically as per that shown in FIG. 1 modified so as to provide a forced lubrication system.

The joint shown in FIG. 4 includes those parts shown in FIG. 1 with the addition of lubricant passageways. The parts of the joint shown in FIG. 4 corresponding to the parts of the joint shown in FIG. 1 are indicated by like reference numerals with the addition of the suffix c and it is to be noted that, as shown in FIG. 4, relative movement has taken place between the inner and outer members of the joint so that the joint members are displaced relative to each other from the positions as shown in FIG. 1, the inner and outer members being shown with their axis coincident with the inner member having moved to the right as viewed in FIG. 4 relative to the outer member.

As shown in FIG. 4 the fixed guide element 34c is formed with a passageway 54 which is connected to a lubricant reservoir (not shown).

At its end remote from the reservoir, the passageway 54 communicates with a series of radially extending ducts 55 formed in the fixed guide element 34c and the ducts 55 permit the flow of lubricant from the passageway 54 into the bore 30c of the location member 20c. The location member 29c is formed with a series of radially extending ducts 56, there being one duct 56 corresponding to each of the balls 14c and the ducts 56 permit the passage of lubricant into the annular space 57 between the two bearing elements 24c and 25c. The inner member 12c is formed with a series of radial passages 58 communicating with the annular space 57 for the flow of lubricant into the ball grooves 13c for the flow of lubricant into said grooves.

The head portion 43c of the spring-loaded element 44c is formed with a series of circumferentially spaced slots 59 for the flow of lubricant from one side of said head portion 43c to the other. The shaft 46c of the element 44c is formed with an axial bore 60 which, near its end adjacent the head portion 43c, is formed with radial ducts 61 permitting the flow of lubricant from the bore portion 23c into the axial bore 60 of the shaft 46c.

The joint is supplied with lubricant and the arrangement is such that, during operation of the joint, the lubricant is forced to flow through the series of passageways ensuring continuous lubrication of the tracks along which the balls 14c are arranged to move.

The spring damping arrangement in FIG. 4 functions in precisely the same way as the spring damping arrangement of FIG. 1.

Figure 5:
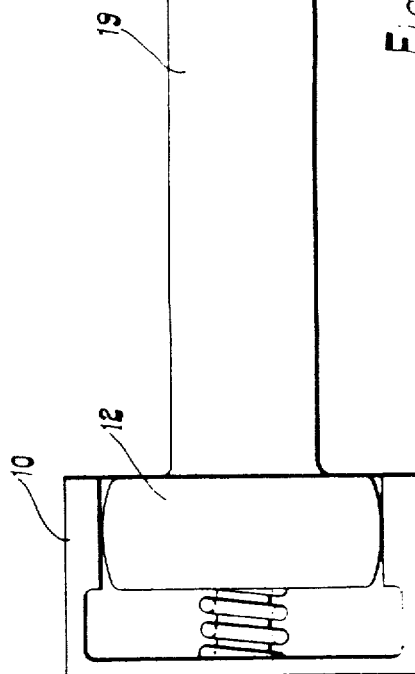

FIG. 5 is highly diagrammatic representation of a shaft 19 connecting a pair of joints each constructed as shown in FIG. 1, FIG. 2, FIG. 3, or FIG. 4 with the inner and outer members 10 and 12 thereof arranged for axial movement and with spring means arranged to damp movement of the shaft 19 relative to the two outer members 10.

If the spring 38 is omitted from the joint of FIG. 1, the head portion 35 of the fixed guide element 34 will abut the shoulder provided at the junction between the mouth portion 31 and the intermediate portion 32 of the bore 30 to limit the extent of travel of the inner member to the left relative to the outer member as viewed in FIG. 1.

If the springs 38a 38b, 38c respectively are omitted from the joints of FIGS. 2, 3 and 4 respectively, the head portions of the guide elements 34a, 34b, 34c respectively will likewise act as travel limiting elements.

A joint as shown in any one of FIGS. 1 to 4 may be provided at one end of the shaft 19 with a joint as shown in specification No. 1,072,144 at the other end of the shaft.

We claim:

1. A plunging constant velocity joint which includes inner and outer members formed with grooves, the grooves in the two members co-operating to form tracks which are angularly distributed around the joint axis, torque-transmitting balls which are engaged in the tracks and move along them during relative movements between the inner and outer members, the inner member being formed with a bore, bearing means contained in said bore and having internal part-spherical surface means the center of curvature of which coincides with the joint center, and a location member contained in said bore and having a part-spherical outer surface complementary to and co-operating with, the internal surface means of said bearing means, characterized in that the joint further includes an elongated guide element which is fixed relative to the outer member and is arranged with its longitudinal axis coincident with the longitudinal axis of the outer member, and a helical spring surrounding said elongated guide element and arranged to act between the location member and the outer member to control relative movement between said members.

2. A plunging constant velocity joint according to claim 1 wherein the spring acts between a first abutment constituted by part of the location member and a second abutment which is fixed relative to the elongated guide element.

3. A plunging constant velocity joint according to claim 1 wherein the elongated guide element, the location member and the inner member of the joint are formed with lubricant passageways for the flow of lubricant supplied from an external lubricant supply.

4. A plunging constant velocity joint which includes inner and outer members formed with grooves, the grooves in the two members co-operating to form tracks which are angularly distributed around the joint axis, torque-transmitting balls which are engaged in the tracks and move along them during relative movements between the inner and outer members, the inner member being formed with a bore, bearing means contained in said bore and having internal part-spherical surface means the center of curvature of which coincides with the joint center, and a location member contained in said bore and having a part-spherical outer surface complementary to and co-operating with, the internal surface means of said bearing means, characterized in that the joint further includes an elongated element which is fixed relative to the outer member and passes through a bore in the location member, said elongated element being provided with an enlarged head portion arranged to co-operate with the location member to limit travel of the inner member relative to the outer member in one direction.

5. A plunging constant velocity joint according to claim 4 wherein resilient means are provided acting between the location member and the outer member to control relative movement between said members.

6. A constant velocity joint according to claim 5 wherein the resilient means includes a helical spring arranged with its longitudinal axis coincident with the longitudinal axis of the joint outer member.

7. A constant velocity joint according to claim 4 wherein the elongated element, the location member and the inner member are formed with lubricant passageways for the flow of lubricant supplied from an external lubricant supply.

8. A constant velocity universal joint comprising an outer member having a cylindrical bore formed with angularly spaced longitudinal grooves, an inner member having a part-spherical outer surface formed with angularly spaced longitudinal grooves each situated opposite a respective groove of the outer member, torque transmitting balls each engaged in and between a respective pair of the opposed grooves, and a cage member having openings in which the balls are received respectively, the cage having internal and external part-spherical guide surfaces which respectively engage the part-spherical outer surface of the inner member and the cylindrical surface of the bore of the outer member to maintain the balls in a bisector plane when the inner and outer members are displaced from an angularly aligned position, the centers of the guide surfaces being spaced apart longitudinally so as to lie equidistantly on opposite sides of the center of the joint, characterized in that the joint further includes a spring loaded location member fixed at one end to the outer member and having at the other end a part-spherical outer surface which has its center coincident with the center of the joint and co-operates with a complementary part-spherical surface internally of a bore in the inner member of the joint, said location member acting directly between the outer member and the inner member.

* * * * *